Patented Jan. 15, 1952

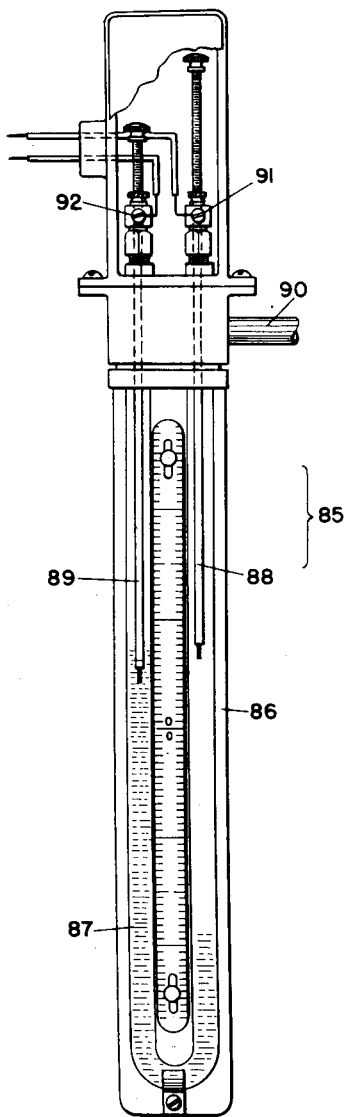

2,582,837

UNITED STATES PATENT OFFICE 2,582,837

SAFETY CONTROL FOR ABSORPTION REFRIGERATION MACHINES

Louis H. Leonard, Jr., Syracuse, N. Y., assignor to Carrier Corporation, Syracuse, N. Y., a corporation of Delaware Application March 31, 1949, Serial No. 84,702

9 Claims. (Cl. 62—5)

1

This invention relates to absorption refrigeration systems and more particularly to an absorption refrigeration system including a safety control for discontinuing operation of the system in response to a predetermined increase in temperature of refrigerant leaving the evaporator of the system indicating failure of the various pumps and motors required in connection with the operation of the system or of the various control devices employed in connection with the system.

The chief object of the present invention is to provide an absorption refrigeration system including pneumatically operable control means and means for preventing the operation of at least some of such control means in response to a predetermined increase in temperature of refrigerant leaving the evaporator, failure of various pumps, shortage of absorbent solution or increase in the absolute pressure in the absorber shell.

An object of the invention is to provide an absorption refrigeration system including pneumatically operable control means and a solenoid valve disposed in the compressed air supply line, the electrical circuit to the solenoid valve being broken in response to a predetermined increase in temperature of refrigerant leaving the evaporator on failure of various pumps, shortage of absorbent solution or increase in the absolute pressure in the absorber shell, thereby closing the solenoid valve to discontinue the supply of compressed air to at least some of the controls of the system and to vent such compressed air to atmosphere.

A further object is to provide an absorption refrigeration system including pneumatically operable control means and a safety control adapted to discontinue the supply of heating medium to the generator and supply cooling medium to the absorber and condenser upon a predetermined increase in temperature of refrigerant leaving the evaporator which reflects a failure or improper operation of the refrigeration system. Other objects of my invention will be readily perceived from the following description.

This invention relates to an absorption refrigeration system comprising in combination an evaporator, an absorber, a generator and a condenser disposed in a closed circuit, means to regulate flow of solution through the circuit, means for regulating the supply of heating medium to the generator, means for regulating the supply of cooling medium to the absorber and to the condenser, a pneumatic supply system for actuating

2 said regulating means and means for venting at least a portion of the pneumatic supply system to the atmosphere to discontinue operation of the absorption refrigeration system.

The attached drawings illustrate a preferred embodiment of my invention in which:

Figure 3 is a view in elevation illustrating a manometer for use as a primary control.

Figure 1:
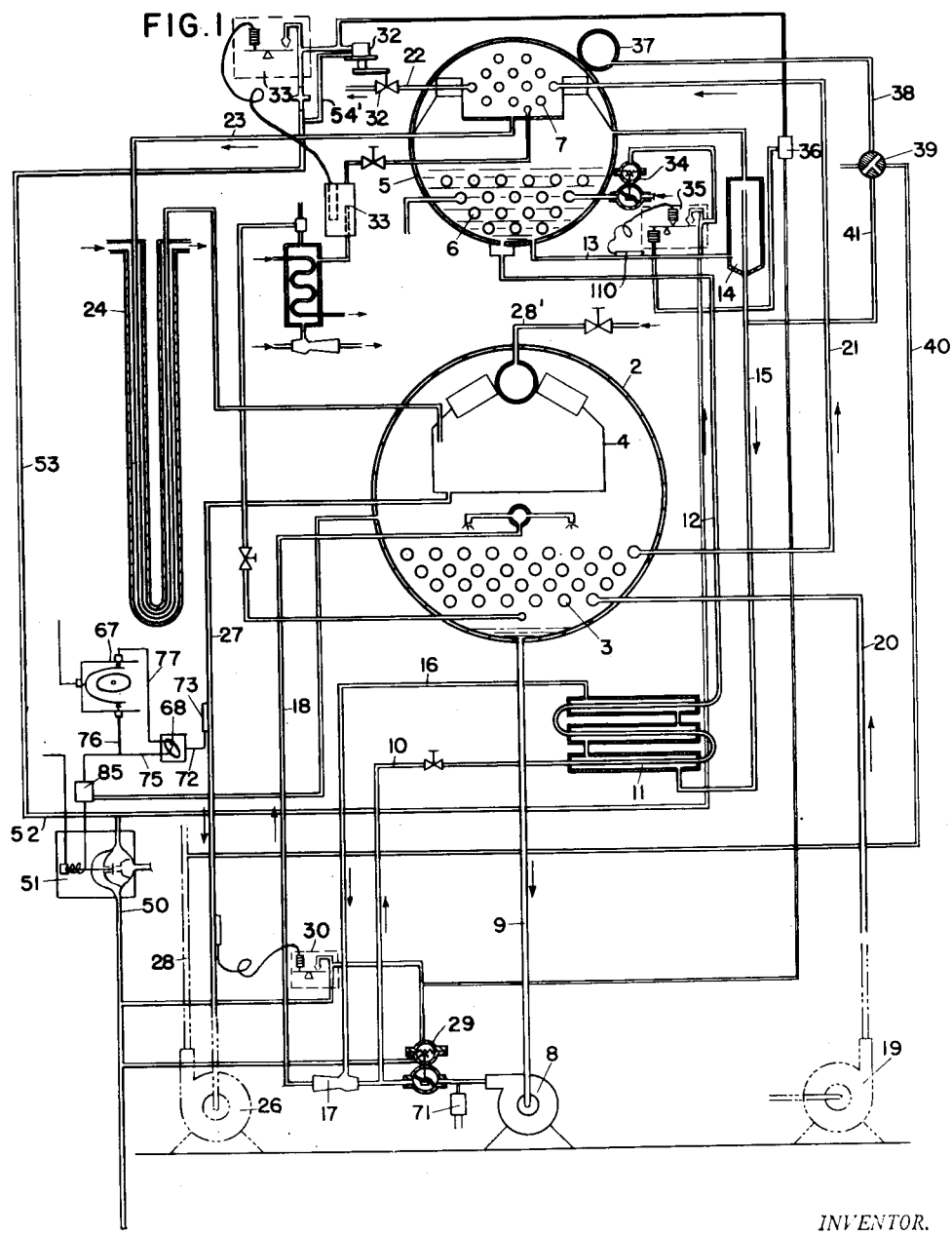
Figure 1 is a diagrammatic view of an absorption refrigeration system including the present safety control.

Referring to the attached drawings, there is shown a shell 2 in which is disposed a coil 3 which cooperates with the shell to form an absorber. A pan-like member 4 is disposed in shell 2 above the absorber and cooperates with the shell to form an evaporator. A second shell 5 is disposed above shell 2; a coil 6 is provided in shell 5 which cooperates therewith to form a generator or boiler. A second shell 7 is disposed above the generator in shell 5 and cooperates with the shell to form a condenser.

Weak solution is withdrawn from absorber 3 by pump 8 through line 9 and is forwarded to generator 6 through line 10, heat exchanger 11 and line 12. Strong solution is withdrawn from generator 6 through line 13, overflow arrangement 14, line 15, heat exchanger 11, and line 16 to ejector 17 which forwards strong solution through line 18 to absorber 3. Arrangement 14 prevents solution in generator 6 rising above or sinking below a predetermined level and aids in maintaining a desired head upon ejector 17.

A pump 19 passes cooling water through line 20 to the coil of absorber 3 and then forwards the water after its passage through absorber 3 through line 21 to the coil of condenser 7, such water leaving the condenser through line 22.

A line 23 permits the withdrawal of vapor condensate from condenser 7, the condensate passing through a precooler 24 and then being returned to evaporator 4. A suitable purge arrangement, described and claimed in the copending application of Alexis A. Berestneff, Serial No. 29,527, filed May 27, 1948, now Patent No. 2,520,027, dated August 22, 1950, is provided to purge condenser 7 and absorber 3 of noncondensible gases.

Chilled water treated by the system is withdrawn from evaporator 4 by pump 25 through line 27, and is circulated through line 28 to an air conditioning device (not shown) and is returned to the evaporator 4 through line 28'. The returned water is sprayed in evaporator 4, being flash-cooled, the flashed vapor passing downward to be absorbed by solution in the absorber 3 while the chilled water is withdrawn from evaporator 4, as described above. Such system is described and claimed in the co-pending application of Alexis A. Berestneff, Serial No. 683,387, filed July 13, 1946, now Patent No. 2,565,943, dated August 28, 1951. Reference is made to such application for a more complete description of the absorption refrigeration system.

A suitable control arrangement for such absorption refrigeration system is shown in detail in the co-pending application of Alexis A. Berestneff and William L. McGrath, Serial No. 683,390, filed July 13, 1946, now Patent No. 2,565,838, dated August 28, 1951, and reference is made thereto for a description of the details of the control arrangement. The control arrangement includes a valve 29 disposed in the solution line connecting pump 8 and heat exchanger 11. Such valve 29 is regulated by a thermostat 30 operable in response to changes in load conditions reflected for example, by a bulb disposed in or adjacent line 27 reflecting the temperature of chilled water leaving the evaporator. Valve 29 and thermostat 30 are connected to a pneumatic supply system 31 hereinafter described.

A valve 32 is disposed in line 22 to regulate passage of condensing water through the absorber and the condenser. Valve 32 may comprise a normally closed butterfly valve operable by a motor connected to pneumatic supply system 31 and regulated by means of a control 33 reflecting saturated temperature corresponding to pressure in shell 5.

Valve 34 regulates passage of steam to the generator. Valve 34 is governed by a control 35 connected to pneumatic supply system 31; and actuated in response to temperature of solution leaving the generator 6 as reflected by bulb 119.

A reset control 36 is provided to reset control 35 in response to the difference in compressed air pressure in the lines connecting valve 29 with thermostat 30 and control 33 with valve 32.

A dilution tank 37 is disposed adjacent shell 5 and is connected by line 38 to a three-way valve 39 connected to pneumatic supply system 31. This three-way valve 39 is connected by line 40 to the discharge side of pump 26. It is also connected by line 41 to solution line 15. Upon start-up of the system, pump 26 fills tank 37 with water; when operation of the system is discontinued valve 39 shifts to a second position and permits water in tank 37 to be returned to the system through line 41. The arrangement for diluting the system upon shutdown is described and claimed in the co-pending application of Alexis A. Berestneff, Serial No. 65,432, filed December 15, 1948.

The present invention is concerned primarily with a safety control effective to discontinue operation of the system upon failure of various control elements, pumps or motors which might interfere with operation of the system. If a failure in the system occurs, the temperature of chilled water leaving the evaporator rises so that a predetermined increase in temperature of chilled water leaving the evaporator may be used as an indication of failure of various pumps, shortage of absorbent solution or increase in the absolute pressure in the absorber shell.

Figure 2:
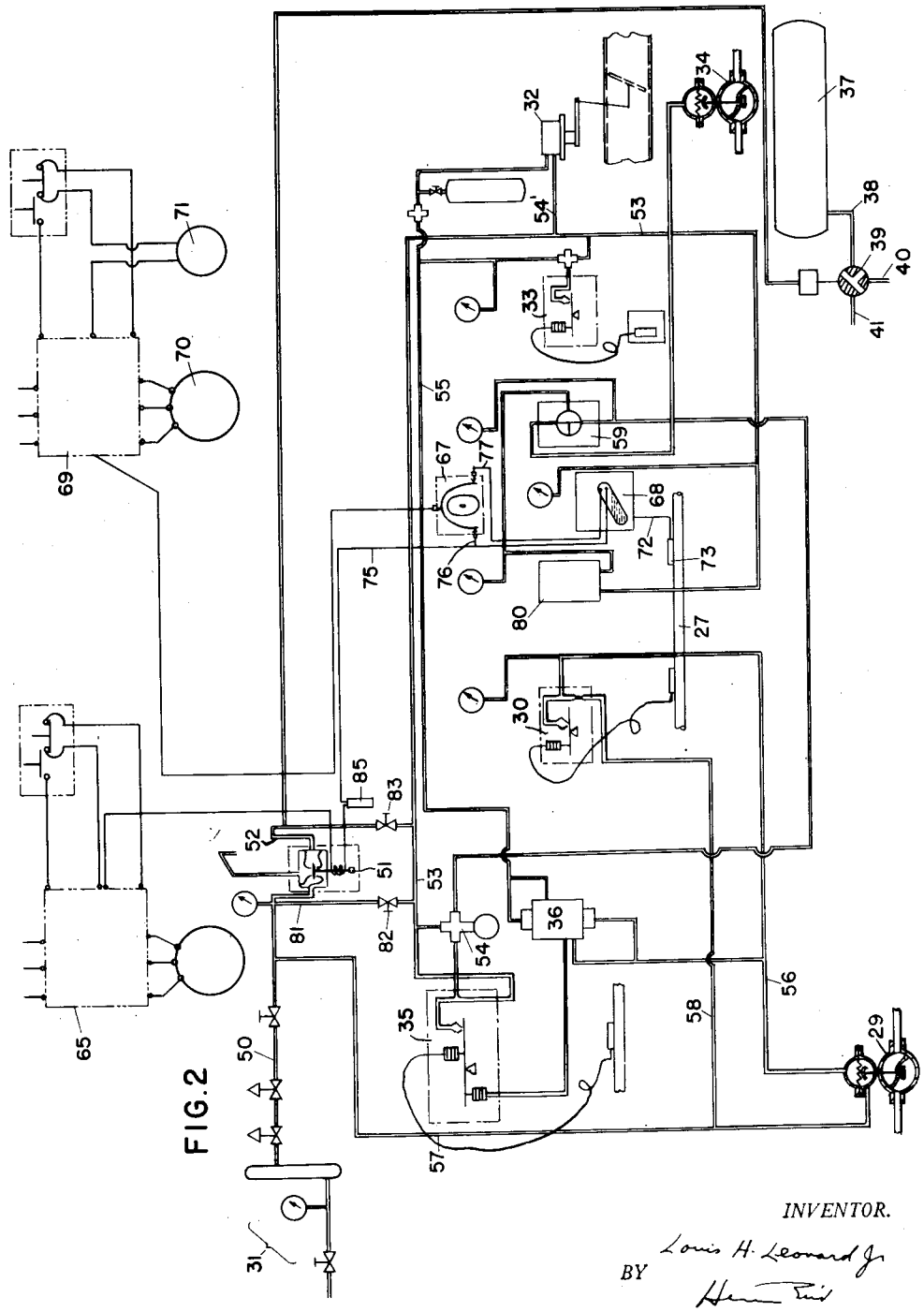
Figure 2 is a diagrammatic view illustrating the control arrangement for the absorption refrigeration system shown in Figure 1.

Referring to Figure 2, it will be noted that the supply air line 50 of pneumatic supply system 31 is connected to a three-way solenoid valve 51. Solenoid valve 51 may be a so-called electric-pneumatic relay and includes three ports, A, B and C. Port A is connected to supply line 50; port C is connected through secondary line 52 to secondary line 53 which supplies compressed air to the various controls except control 30 and valve 29. Compressed air passes through control 35 and is supplied through a reversing relay 54 and a diverting switch or control 59 to regulate valve 34. The motor control valve 32 is also connected to line 53 by line 54'. Control 33 is connected to line 55 connecting reset control 36 and the motor of valve 32. Reset control 36 is also connected to line 56 connecting valve 29 and thermostat 30. Thus the reset control is responsive to the difference in pressure in such lines to reset the operating point of valve 34.

Line 57 and a second line 58 connected thereto connects thermostat 30 directly with supply air line 50; valve 29 is connected to line 50 by line 57. Compressed air supplied to thermostat 30 and valve 29 need not pass through the solenoid valve 51.

Three-way pneumatic valve 39 is also connected to line 53 so that it is actuated when solenoid valve 51 is energized. Bypass valves 82 and 83 hereinafter described around solenoid valve 51 are arranged so that three way valve 39 is not operated when valve 51 is out of action (valved off).

Solenoid valve 51 is connected to the electrical circuit of the system including the starter 65 for chilled water motor 66, a three-position electric switch 67, a mercury contact switch 68 and intervening connections to solution pump, starter 69 actuating motors 70 and 70' to operate the solution pump and the condensing water pump and a pressure switch 71 located adjacent the discharge of solution pump 8.

Mercury contact switch 68 is connected by capillary tube 72 to a bulb 73 disposed in or adjacent to the chilled water line 27. It will be noted (refer to Figure 2) that wire 75 connects a terminal of switch 68 with solenoid valve 51. A second wire 76 connects wire 75 with a terminal of switch 67. A wire 77 also connects switch 68 with a second terminal of switch 67.

Considering the operation of the safety control, switch 67 has three positions, off, start and run. When such switch is in the off position, of course, the system is not in operation.

When switch 67 is in starting position, ports A and C of solenoid valve 51 are connected, permitting the supply of air to the various controls and valves 32, 33, 34 and 35, etc.; at such time mercury contact switch is not in operation being short circuited through wire 76. As soon as the temperature of the chilled water leaving the evaporator falls to a predetermined point the switch is placed in the "run" position and mercury contact switch 68 assumes control. The machine is then in so-called running condition. Assume, thereafter that, due to failure of some element of the control or machine, the temperature of chilled water leaving the evaporator rises to a predetermined point on failure of various pumps, shortage of absorbent solution or increase in the absolute pressure in the absorber shell. In such case switch 68 is opened, breaking the flow of current through solenoid coil 51. Upon failure of current to solenoid valve 51, ports A and C are disconnected, ports C and B being connected and permitting venting or bleeding of compressed air to surrounding atmosphere. When the compressed air is vented to the atmosphere, valves 32 and 34 are immediately moved to closed position. The chilled water pump and the solution pump continue to operate provided failure of either did not cause the safety control to function. Compressed air continues, of course, to be supplied to valve 29 and its control 30.

When valves 32 and 34 are in closed position valve 39 moves from one position to a second position permitting tank 37 to empty its contents through line 41 to a solution line. It is desirable that the solution pump continue to operate in order to assure proper mixing of additional water with solution in the system upon shut-down. If solution pump motor or pump or chilled water motor or pump switch 66 fail, the electrical circuit is automatically broken to discontinue operation of the system.

Referring to Figure 2 it will be noted that a manual switch 80 is provided which is connected to line 53. By-pass line 81 is also provided connecting line 53 with the main supply line 50. A valve 82 is disposed in line 81. It will be noted a second valve 83 is disposed in line 52 connecting solenoid valve 51 with line 53. Under some conditions it may be desirable to by-pass solenoid valve 51; by-pass line 81 and valve 82 therein permit solenoid valve 51 to be by-passed. Valve 83 assures that compressed air supplied to line 53 under such conditions does not escape through ports B and C of solenoid valve 51.

If desired a manometer 85 may be placed in the electrical circuit between solenoid valve 51 and its connections to switches 67 and 68. Manometer 85 serves as a primary control to prevent closing of the electrical circuit until a desired pressure is attained in the absorber. It assures that the refrigeration system cannot be started until the machine is thoroughly purged. Manometer 85 as shown in Figure 3 includes a U-shaped tube 86 having mercury 87 therein. Connector rods 88 and 89 extend into tube 86. One end of tube 86 is completely evacuated and sealed; the other end is connected to absorber 3 by line 90. The contacts 91 and 92 are connected into wire 75. If pressure in the absorber is too high, evincing a need for purging, the mercury level in the connected end of tube 86 is forced down preventing closing of the electrical circuit. As pressure in the absorber decreases to the predetermined point, the mercury level rises and as the mercury contacts rod 89 the circuit is closed permitting the machine to operate as described above.

It will be appreciated the manometer 85 interrupts operation of the machine if absolute pressure in the absorber reaches a predetermined point, breaking the electrical circuit to close the steam and condensing water valves and diluting the solution as described above.

It will be appreciated solenoid valve 51 is connected with the starter of the chilled water pump and also with the starter of the solution pump; if either fails solenoid valve 51 functions to shut off the system. It is also connected indirectly to pressurestat or pressure switch 71 disposed adjacent the discharge of solution pump 8 so that if the solution pump fails or there is a shortage of solution the solenoid valve functions to shut off the system.

It is desirable that the solution valve remain open upon shut down due to failure of some element of the system, in order that the water added to the system from tank 37 is thoroughly mixed with solution in the system.

If solution crystallizes in the generator under various conditions it may be desired to supply steam to the generator manually. For this purpose it is necessary to by-pass solenoid valve 51 so that by-pass 81 and valves 82 and 83 may be employed. Under these conditions, dilution valve 39 is inoperative.

The present invention provides a simple and inexpensive safety control for an absorption refrigeration machine assuring that operation of the machine will be discontinued upon failure of the control elements or the circulating pumps and motors therefor. The safety control provided by this invention permits automatic dilution of solution upon shut down. The safety control so provided is economical and may be readily included in the control arrangement of the machine during manufacture or after the machines are employed in the field.

While I have described and illustrated a preferred embodiment of my invention, it will be understood that my invention is not limited thereto since it may be otherwise embodied within the scope of the following claims:

I claim:

1. In an absorption refrigeration system, the combination of an absorber, an evaporator, a generator and a condenser disposed in a closed circuit, means for regulating flow of solution through the circuit; means for regulating supply of heating medium to the generator; means for regulating supply of cooling medium to the absorber and condenser, a pneumatic supply system for actuating the regulating means, means for reflecting a predetermined increase in temperature of chilled water leaving the evaporator, and means for venting at least a portion of the pneumatic supply system to the atmosphere to discontinue operation of the absorption system, said venting means being actuated by said reflecting means.

2. In an absorption refrigeration system, the combination of an absorber, an evaporator, a generator and a condenser disposed in a closed circuit, means for regulating flow of solution through the circuit; means for regulating supply of heating medium to the generator; means for regulating supply of cooling medium to the absorber and condenser, a pneumatic supply system for actuating the regulating means, and means for venting to atmosphere compressed air supplied to the heating and cooling regulating means to discontinue supply of heating medium to the generator and supply of cooling medium to the absorber and the condenser.

3. In an absorption refrigeration system, the combination of an absorber, an evaporator, a generator and a condenser disposed in a closed circuit, a valve in the circuit regulating flow of solution through the circuit, means for regulating supply of heating medium to the generator, means for regulating supply of cooling medium to the absorber and the condenser, a pneumatic supply system for actuating said valve, said heating medium regulating means and said cooling medium regulating means, and a safety control for discontinuing operation of the refrigeration system, said safety control including an operating switch, a second switch responsive to a predetermined increase in temperature of chilled water leaving the evaporator and means in the pneumatic supply system for venting compressed air therein to the atmosphere whereby upon a predetermined increase in temperature of chilled water leaving the evaporator operation of the system is discontinued.

4. In an absorption refrigeration system, the combination of an absorber, an evaporator, a generator and a condenser disposed in a closed circuit, means for regulating flow of solution through the circuit, means for regulating the supply of heating medium to the generator, means for regulating supply of cooling medium to the absorber and to the condenser, a pneumatic supply system for actuating said means, said pneumatic supply system including a supply line for compressed air and secondary lines connecting the supply line with said regulating means, a three-way solenoid valve disposed in said supply line, an operating switch, a second switch, an electrical circuit including the solenoid valve and first and second switches, said second switch serving in response to a predetermined increase in the temperature of chilled water leaving the evaporator to break the electrical circuit thereby closing the solenoid valve and permitting compressed air in the pneumatic supply system to vent to atmosphere.

5. In an absorption refrigeration system, the combination of an absorber, an evaporator, a generator and a condenser disposed in a closed circuit, a valve for regulating flow of solution through the circuit, a thermostat for actuating said valve in response to load conditions, means for regulating supply of heating medium to the generator, means for regulating supply of cooling medium to the absorber and to the condenser, a pneumatic supply system for supplying compressed air to the valve, the thermostat and said regulating means, said pneumatic supply system including a supply line and secondary lines connected to said regulating means, a solenoid valve disposed in said supply line to control supply of compressed air to said regulating means, a secondary line connecting the supply line with said solution regulating valve and said thermostat, said secondary line being disposed between the source of supply of compressed air and said solenoid valve, an operating switch, and a control switch for said solenoid valve responsive to a predetermined increase in temperature of chilled water leaving the evaporator whereby upon a predetermined increase in temperature of chilled water leaving the evaporator the solenoid valve is closed to discontinue supply of compressed air to said regulating means, while permitting continued supply of compressed air to said valve and to said thermostat.

6. An absorption refrigeration system according to claim 3 in which a manometer is provided to prevent operation of the system until pressure in the absorber has reached a predetermined low point.

7. In an absorption refrigeration system, the combination of an absorber, an evaporator, a generator and a condenser disposed in a closed circuit, means for circulating solution through the circuit, a valve in said circuit for regulating the passage of solution through the circuit, a thremostat for controlling said valve in response to load conditions, a second valve for regulating passage of steam to the generator, a third valve for regulating passage of cooling water through the absorber and the condenser, a second control for regulating said second valve, a third control for regulating said third valve, a pneumatic supply system for supplying compressed air to operate said controls and means for venting at least a portion of the pneumatic supply system to the atmosphere to discontinue operation of the absorption system.

8. In an absorption refrigeration system, the combination of a first shell, a first element in the shell cooperating therewith to form an absorber, a second element in said shell cooperating therewith to form an evaporator, a second shell, a first element in said second shell cooperating therewith to form a generator, a second element in said second shell cooperating therewith to form a condenser, said absorber, evaporator, generator and condenser being disposed in a closed circuit, means for passing solution through said circuit, a pneumatically operable control regulating passage of solution through the circuit, a second pneumatically operable control regulating supply of heating medium to the generator, a third pneumatically operable control regulating supply of cooling medium to the absorber and the condenser, a pneumatic supply system, means for venting at least a portion of the pneumatic supply system to the atmosphere to discontinue operation of the refrigerating system and a safety control responsive to a predetermined increase in temperature of chilled water leaving the evaporator, said safety control including the venting means in the supply line of the pneumatic supply system, an operating switch and a control switch responsive to a predetermined increase in temperature of chilled water leaving the evaporator, an electrical circuit connecting the venting means, operating switch and control switch, said control switch in response to a predetermined increase in temperature of chilled water leaving the evaporator breaking the electrical circuit to vent compressed air from the pneumatic supply system to the atmosphere and to discontinue supply of compressed air to the heating and cooling medium controls.

9. A safety control for an absorption refrigeration system including pneumatically operable controls, the combinatiion of a solenoid valve disposed in an air supply line to at least some of said controls, a switch, an electrical circuit including the solenoid valve and the switch, means for actuating the switch in response to a predetermined increase in temperature of chilled water leaving the evaporator of the system to break the electrical circuit thereby closing the solenoid valve and discontinuing air supply to the controls supplied therethrough.

LOUIS H. LEONARD, Jr.

REFERENCES CITED

The following references are of record in the file of this patent:

UNITED STATES PATENTS

| Number | Name | Date |
|---|---|---|
| 2,287,441 | McGinnis | June 23, 1942 |
| 2,298,924 | Bichowsky | Oct. 13, 1942 |
| 2,461,513 | Berestneff | Feb. 15, 1949 |
| 2,470,756 | Berestneff | May 24, 1949 |